United States Patent
Rabinowitz

(10) Patent No.: US 7,773,290 B2
(45) Date of Patent: Aug. 10, 2010

(54) CONTROL GRID INCREASED EFFICIENCY AND CAPACITY FOR SOLAR CONCENTRATORS AND SIMILAR EQUIPMENT

(76) Inventor: Mario Rabinowitz, 715 Lakemead Way, Redwood City, CA (US) 94062

( * ) Notice: Subject to any disclaimer, the term of this patent is extended or adjusted under 35 U.S.C. 154(b) by 517 days.

(21) Appl. No.: 11/857,668

(22) Filed: Sep. 19, 2007

(65) Prior Publication Data

US 2009/0073541 A1    Mar. 19, 2009

(51) Int. Cl.
G02B 26/00 (2006.01)
G02B 7/182 (2006.01)

(52) U.S. Cl. .................... 359/296; 359/851

(58) Field of Classification Search .......... 359/296, 359/851

See application file for complete search history.

(56) References Cited

U.S. PATENT DOCUMENTS

| | | | |
|---|---|---|---|
| 5,075,591 A | 12/1991 | Holmberg |
| 5,717,514 A | 2/1998 | Sheridon |
| 5,717,515 A | 2/1998 | Sheridon |
| 5,754,332 A | 5/1998 | Crowley |
| 5,919,409 A | 7/1999 | Sheridon |
| 6,445,489 B1 | 9/2002 | Jacobson |
| 6,473,072 B1 | 10/2002 | Comiskey et al. |
| 6,843,573 B2 | 1/2005 | Rabinowitz et al. |
| 6,957,894 B2 | 10/2005 | Rabinowitz et al. |
| 6,964,486 B2 | 11/2005 | Rabinowitz |
| 6,975,445 B1 | 12/2005 | Rabinowitz |
| 6,988,809 B2 | 1/2006 | Rabinowitz |
| 7,112,253 B2 | 9/2006 | Rabinowitz |
| 7,115,881 B2 | 10/2006 | Rabinowitz |
| 7,130,102 B2 | 10/2006 | Rabinowitz |
| 7,133,183 B2 | 11/2006 | Rabinowitz |
| 7,187,490 B2 | 3/2007 | Rabinowitz |
| 2005/0034750 A1 | 2/2005 | Rabinowitz |
| 2006/0150968 A1 | 7/2006 | Rabinowitz |

FOREIGN PATENT DOCUMENTS

WO    PCT/US02/20199    6/2002

*Primary Examiner*—William C Choi

(57) ABSTRACT

This invention provides a better means to achieve affordable solar energy. It does so by increasing the efficiency and capacity of control grids (for addressing and alignment) in solar concentrators, and similar equipment. Method and apparatus are described for going from a 25% grid efficiency and capacity to a more than 90% grid efficiency and capacity. The instant invention relates to improvements in the control (addressing and alignment) grid for Solar Energy Concentrators, and similar equipment. The control grid acts to address and align active optical elements such as mirrored balls, electrophoretic, and magnetophoretic cells in solar concentrators [e.g. cf. U.S. Pat. Nos. 7,133,183 and 6,843,573 by M. Rabinowitz]. This invention also reduces the cost of transistor grids by greatly reducing the number of grid junctions and hence the number and cost of transistors. Moreover, the present invention simplifies the grid making it more feasible to use the same voltage supply sequentially to further reduce costs, rather than having multiple voltage sources.

20 Claims, 4 Drawing Sheets

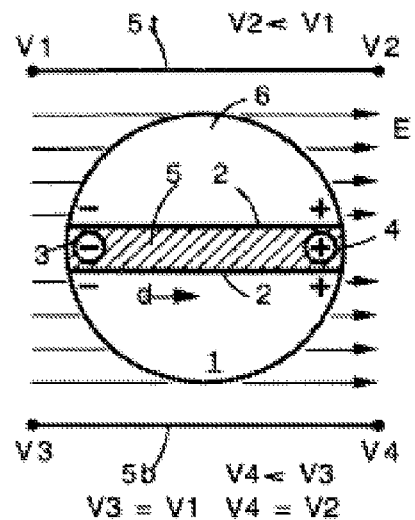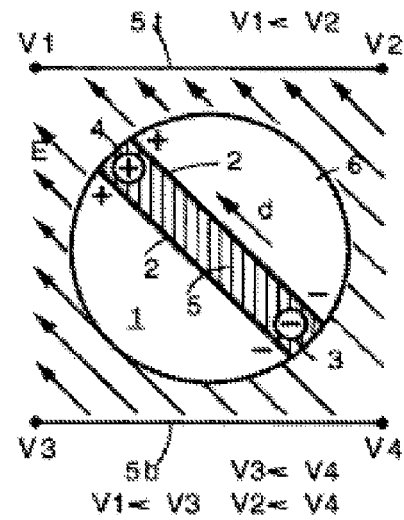
Fig. 1a                Fig. 1b
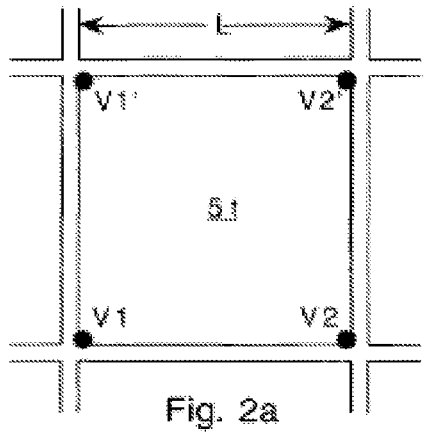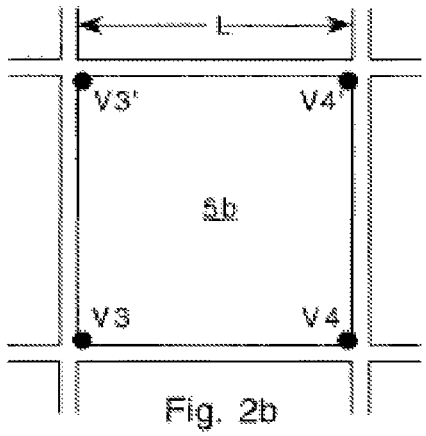
Fig. 2a                Fig. 2b

CONTROL GRID INCREASED EFFICIENCY AND CAPACITY FOR SOLAR CONCENTRATORS AND SIMILAR EQUIPMENT

FIELD OF THE INVENTION

The instant invention relates to improvements in the control (addressing and alignment) grid for Solar Energy Concentrators, and similar equipment. The control grid acts to address and align active optical elements such as mirrored balls, electrophoretic, and magnetophoretic cells in solar concentrators [e.g. cf. U.S. Pat. Nos. 7,133,183 and 6,843,573 by M. Rabinowitz].

BACKGROUND OF THE INVENTION

This invention provides a better means to achieve affordable solar energy. It does so by increasing the efficiency and capacity, as well as the optical transparency of control grids (for addressing and alignment) in solar concentrators, and similar equipment. Method and apparatus are described for going from a 25% grid efficiency and capacity to a more than 90% grid efficiency and capacity.

INCORPORATION BY REFERENCE

In a solar energy application (as well as other functions), elements in the form of transparent reflecting micro-balls and other shapes are a critical feature of a unique solar concentrator which directs sunlight to a receiver as described in the following patents and published papers related to this case. The following U.S. patents, and Solar Journal publication are fully incorporated herein by reference.

1. U.S. Pat. No. 7,247,790 by Mario Rabinowitz, "Spinning Concentrator Enhanced Solar Energy Alternating Current Production" issued on Jul. 24, 2007.
2. U.S. Pat. No. 7,187,490 by Mario Rabinowitz, "Induced Dipole Alignment Of Solar Concentrator Balls" issued on Mar. 6, 2007
3. U.S. Pat. No. 7,133,183 by Mario Rabinowitz, "Micro-Optics Solar Energy Concentrator" issued on Nov. 7, 2006.
4. U.S. Pat. No. 7,130,102 by Mario Rabinowitz, "Dynamic Reflection, Illumination, and Projection" issued on Oct. 31, 2006.
5. U.S. Pat. No. 7,115,881 by Mario Rabinowitz and Mark Davidson, "Positioning and Motion Control by Electrons, Ions, and Neutrals in Electric Fields" issued on Oct. 3, 2006.
6. U.S. Pat. No. 7,112,253, by Mario Rabinowitz, "Manufacturing Transparent Mirrored Mini-Balls for Solar Energy Concentration and Analogous Applications" issued on Sep. 26, 2006.
7. U.S. Pat. No. 7,077,361, by Mario Rabinowitz, "Micro-Optics Concentrator for Solar Power Satellites" issued on Jul. 18, 2006.
8. U.S. Pat. No. 6,988,809 by Mario Rabinowitz, "Advanced Micro-Optics Solar Energy Collection System" issued on Jan. 24, 2006.
9. U.S. Pat. No. 6,987,604 by Mario Rabinowitz and David Overhauser, "Manufacture of and Apparatus for Nearly Frictionless Operation of a Rotatable Array of Micro-Mirrors in a Solar Concentrator Sheet" issued on Jan. 17, 2006.
10. U.S. Pat. No. 6,975,445 by Mario Rabinowitz, "Dynamic Optical Switching Ensemble" issued on Dec. 13, 2005.
11. U.S. Pat. No. 6,964,486 by Mario Rabinowitz, "Alignment of Solar Concentrator Micro-Mirrors" issued on Nov. 15, 2005.
12. U.S. Pat. No. 6,957,894 by Mario Rabinowitz and Felipe Garcia, "Group Alignment Of Solar Concentrator Micro-Mirrors" issued on Oct. 25, 2005.
13. U.S. Pat. No. 6,843,73 by Mario Rabinowitz and Mark Davidson, "Mini-Optics Solar Energy Concentrator" issued on Jan. 18, 2005.
14. U.S. Pat. No. 6,738,176 by Mario Rabinowitz and Mark Davidson, "Dynamic Multi-Wavelength Switching Ensemble" issued on May 18, 2004.
15. U.S. Pat. No. 6,698,693 by Mark Davidson and Mario Rabinowitz, "Solar Propulsion Assist" issued on Mar. 2, 2004.
16. U.S. Pat. No. 6,612,705 by Mark Davidson and Mario Rabinowitz, "Mini-Optics Solar Energy Concentrator" issued on Sep. 2, 2003.
17. Solar Energy Journal, Vol. 77, Issue #1, 3-13 (2004) "Electronic film with embedded micro-mirrors for solar energy concentrator systems" by Mario Rabinowitz and Mark Davidson.

DEFINITIONS

"Adjustable Fresnel reflector" is a variable focusing planar reflecting surface much like a planar Fresnel lens is a focusing transmitting surface. Heuristically, it can somewhat be thought of as the projection of thin variable-angular segments of small portions of a thick mirror upon a planar surface whose angles can be adjusted with respect to the planar surface.

"Bus bars are low resistivity electrodes that permit uniform distribution of voltage across a high resistivity optically transparent surface, in contrast to the grid wires which are high resistivity.

"Block" is defined herein to mean a set or batch of active compartments of the grid containing mirrored elements (balls, etc.) in active cells, i.e. these elements can be aligned.

"Cell" is herein defined as the smallest cubicle (region) which occupies a spatial volume bounded by edges which may contain (hold) an individual element (ball, etc.).

"Collector" or "Receiver" as used herein denotes any device for the conversion of solar energy into other forms such as electricity, heat, pressure, concentrated light, etc.

"Compartment" is defined herein as the smallest section of the grid that can control (align) an element (ball, etc.).

"Concentrator" as used herein in generally refers to a micro-mirror system for focussing and reflecting light. In a solar energy context, it is that part of a solar Collector system that directs and concentrates solar radiation onto a solar receiver or other device. As used herein, concentrator refers to an ensemble of focussing planar mirrors which acts as a thin almost planar mirror constructed with stepped varying angles so as to have the optical properties of a much thicker concave mirror. Heuristically, it can somewhat be thought of as the projection of thin variable-angular segments of small portions of a thick mirror upon a planar surface. It is a focusing planar reflecting surface much like a planar Fresnel lens is a focusing transmitting surface.

"Efficiency" is defined herein as the percent coverage of the control grid.

"Elastomer" is a material such as synthetic rubber or plastic, which at ordinary temperatures can be stretched substantially under low stress, and upon immediate release of the stress, will return with force to approximately its original length. Silicone elastomers have exceptional ability to withstand ultraviolet light degradation.

"Element" as used here is a rotatable mirrored component of a concentrator, such as a ball, cylinder, disk, semi-sphere, etc.

"Ensemble" is defined herein to mean a set (batch) of mirrored elements (balls, etc.) within a block which are in active cells of the grid, i.e. they can be aligned. A grid "block" controls all the balls in an ensemble within the tile.

"Equipment" is used herein as a generic term for Solar Energy Concentrators and the mirrored elements (balls) within; and similar equipment such as Optical Switches; Dynamic Reflection, Illumination, and Projection equipment; and Display equipment in general. The Solar Energy Concentrators may be of the Fresnel reflector type, or other types and equipment requiring addressing and alignment.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Gap" is a non-conducting (dielectric, insulating) separation between grid blocks. A gap may be as narrow as a fraction of a ball diameter, or as large in width and length as one desires, but is preferably narrow.

"Grid" (electrode assembly) as used herein receives signals from a microprocessor or similar device to address and align, or otherwise control optically active elements in Solar and other optical equipment. Grid wires have high resistance so they can produce voltage drops (potential differences) with only a small flow of electrical current.

"ITO" is a conducting alloy of Indium/Tin Oxide that is transparent. ITO is both expensive and difficult to apply since it must be sputtered on the sheets that contain the balls to form the addressing electrodes of the display.

"Lexan" is General Electric's trade name for a group of polyesters formed from carbonic acid, and generally called polycarbonates (PC). Polycarbonates have excellent mechanical properties while at the same time it has an ease for molding and extrusion. Lexan has good dimensional stability, good resistance to creep, and a high distortion temperature.

"Lucite" is DuPont's trade name for its transparent acrylic plastic and resins with no definite melting point.

"Mirror" as used herein refers to a highly reflective smooth surface (smooth on a size scale small compared to the wavelength of incident light). The smoothness achieves specular reflection.

"Optical communication" as used herein means that an optical signal comes into the equipment, and/or an optical signal goes out of the equipment "Optically transparent" as used herein means transparent to light at least in the range of about 2000 to approximately 7500 Angstroms wavelength.

"Plexiglass" is a transparent plastic made from methyl methacrylate, similar to Lucite. Both can readily be made in sheet form.

"Silicone" as used herein refers to a heat-stable, rubber-like elastomer that is a water repellent, semiorganic polymer of organic radicals attached to silicon containing molecules, such as dimethyl silicone. Silicone elastomers are an excellent material within which to embed the mirrored balls or cylinders, because of their durability with respect to ultraviolet light and general resiliency among other reasons.

"Substrate" is the outside surface of the equipment which contains the grid. The substrate shape is not critical, and the substrate may be flat, curved, patterned, etc., along any portion thereof. The substrate may be formed of a single material or a plurality of materials and have multiple layers, as in a laminated substrate.

"Substrate material equipment" as used herein may be formed of any polymeric or plastic material. Illustrative materials include polyacrylate, polyester, polyethylene, polypropylene, polyamides, polylmides, polycarbonate, epoxy, phenolic, acrylonitrile-butadiene-styrene and acetal plastics. The mirrored balls (elements) are preferably formed of polycarbonate or polyacrylate resin such as poly-methyl methacrylate) because of their excellent physical, mechanical and chemical properties. The substrates may contain various additives such as fillers, antioxidants, plasticizers and the like, in accordance with known techniques.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Tile" is herein defined to be the smallest section of grid (containing both filled cells with elements and unfilled cells with no elements) that can be repeated in either direction of the essentially two-dimensional grid, to fill the approximately two-dimensional space of the entire grid. A grid "tile" controls all the balls in an ensemble within the tile.

"Transistor" as used herein denotes a semiconductor device that acts as an electrically controlled switch.

"Zeta potential," is the net surface and volume charge that lies within the shear slipping surface resulting from the motion of a body through a liquid. It is an electrical potential that exists across the interface of all solids and liquids. It is also known as the electrokinetic potential. The zeta potential produces an electric dipole moment (field) of a spherical body when it is made from two dielectrically different hemispheres due to the interaction of the sphere with the fluid that it is immersed in.

SUMMARY OF THE INVENTION

The instant invention teaches how to increase the efficiency and capacity of both transistorless grids (electrode assembly) and grids with transistors at each junction for an addressable solar concentrator apparatus (or similar equipment). Grids with transistors at each junction are more expensive than transistorless grids, but transistorless grids are more limited in efficiency and capacity. This invention delineates how the limitation of transistorless grids can be circumvented; and how the cost of grids with transistors can be significantly reduced.

The light tracking and focusing Fresnel reflector apparatus of the instant invention has electrically and optically active elements (balls, etc.) some or all of which are rotatably disposed in cells which occupy a spatial volume in proximity to grid compartments. The balls are electrostatically (more generally electromagnetically) coupled to grid tiles. The tiles may be composed of individual compartments, each of which corresponds to and controls an individual cell; or preferably a grid tile controls an ensemble (block) of cells. Each grid compartment, or preferably an entire grid block is addressable by an electrical device such as a microprocessor with means for establishing a first voltage gradient in the vicinity of a selected cell, or preferably a block of selected cells, along a first edge of the selected cell or block of cells; means for establishing a second voltage gradient along a second edge (roughly parallel to the first edge) in the vicinity of a selected cell or block; means for establishing a third voltage gradient along a third edge (roughly parallel to the first and second edges) in the vicinity of a selected cell or block; and means for establishing a fourth voltage gradient along a fourth edge (roughly parallel to the first, second, and third edges) in the vicinity of a selected cell or block In another embodiment of the instant invention, voltages are established at 4 vertices of one face of a grid compartment parallelepiped enclosing a cell or block, with voltages established at the 4 vertices of a second parallel face of the parallelepiped.

In another embodiment of the instant invention, voltages are established at 4 vertices of one face of a grid compartment parallelepiped enclosing a cell or block, with one voltage established at a second parallel face of the parallelepiped, which in this embodiment would be preferably a ground plane.

One may refer to issued U.S. Pat. Nos. 6,964,486 by Mario Rabinowitz, "Alignment of Solar Concentrator Micro-Mirrors," and 7,187,490 by Mario Rabinowitz, "Induced Dipole Alignment Of Solar Concentrator Balls" to obtain a more detailed description and explanation for method and apparatus for addressing elements (mirrored balls, etc.).

In yet another embodiment of the present invention, method and apparatus for a grid (electrodes) includes means for selecting more than one element (ball) of an array, means for generating an electric field in the vicinity of the elements, the field having a direction of orientation, and means for adjusting the orientation of the field over an angular range of directions.

ASPECTS OF THE INVENTION

For those solar concentrators (or similar equipment) that utilize a transistorless grid (electrode assembly) to address the mirrored elements (balls), the instant invention increases the grid efficiency and capacity.

For those solar concentrators (or similar equipment) that utilize transistors at grid junctions, the instant invention significantly reduces the number of grid junctions, significantly reducing the number of transistors, and hence the total cost of transistors.

It is an aspect of the instant invention to provide a largely optically transparent grid for solar concentrators and similar equipment by addressing large blocks of mirrored elements by large spacing between the grid wires.

It is another aspect of the present invention to decrease the cost of the grid since the large spacing between grid wires make expensive optically transparent materials like ITO (alloy of Indium/Tin Oxide) unnecessary.

Another aspect of this invention is to provide a grid for optical equipment, which is both less costly and otherwise superior to an ITO grid.

Another aspect of the instant invention is to reduce the cost of the needed operating power, and capital costs of the voltage supply by applying the same voltage supply sequentially to the individual grid blocks.

Yet another aspect of this invention is to simplify the grid by obviating the need for grid overlays (two sets of grids) on the same side of the cells as well as a larger spaced grid with fewer grid wires.

Another aspect of this invention is to reduce the complexity of the addressing process because there is a larger spaced grid with fewer grid wires.

A fringe benefit aspect of the present invention is the quicker response of an ensemble of mirrored elements (balls) to a given electric field produced by a grid block, than a single element with diameter equal to that of the block of smaller elements.

Other aspects and advantages of the invention will be apparent in a description of specific embodiments thereof, given by way of example only, to enable one skilled in the art to readily practice the invention singly or in combination as described hereinafter with reference to the accompanying drawings and detailed description which will follow shortly. In the detailed drawings, like reference numerals indicate like components.

BRIEF DESCRIPTION OF THE DRAWINGS

FIG. 1a is a cross-sectional view of a rotatable element with an electret dipole sandwiched between induced dipole micro-mirrors aligned parallel to partitioned electrodes where an ensemble of such elements are a major constituent of a micro-optics concentrator.

FIG. 1b is a cross-sectional view of a rotatable element with an electret dipole sandwiched between induced dipole micro-mirrors aligned at a tilted angle with respect to partitioned electrodes where an ensemble of such elements are a major constituent of a micro-optics concentrator.

FIG. 2a is a schematic top view of an array of partitioned highly resistive electrodes showing in detail top electrode of an electronic control grid for rotating the reflecting elements of a solar concentrator or other similar optical equipment. This schematic can represent either passive or active addressing as will be explained in the detailed description.

FIG. 2b represents a bottom view of an array of partitioned highly resistive electrodes showing in detail a view of a bottom electrode and the voltages at its four corners.

GLOSSARY

The following is a glossary of components and structural members as referenced and employed in the instant invention with like reference alphanumerics indicating like components:

1—rotatable element (ball)
2—micro-mirror

Figure 4:
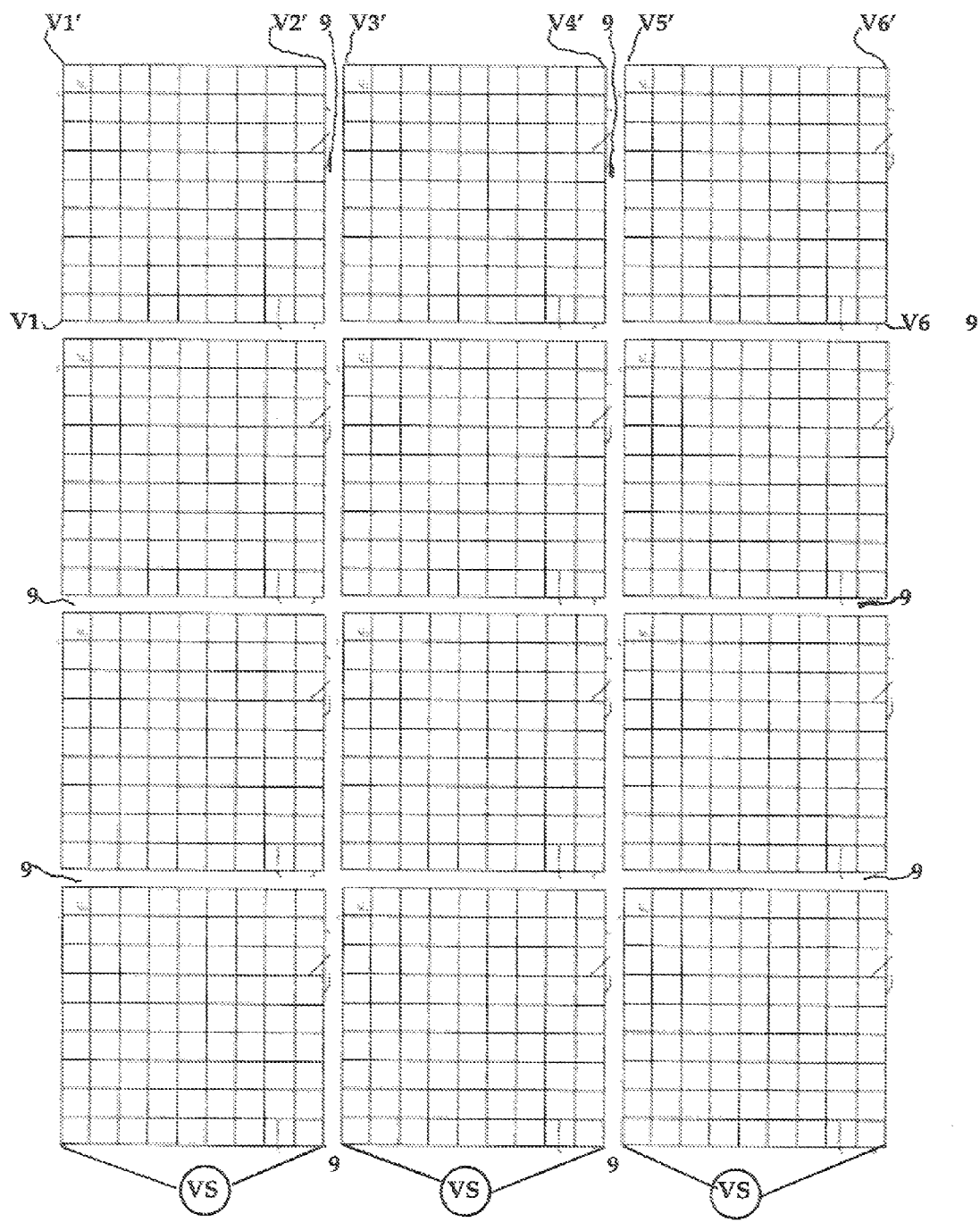
FIG. 4 shows a grid with 12 square tiles each containing a block of 81 active grid compartments (shown in white for ease of counting) with 81% efficiency of coverage.
Figure 5:
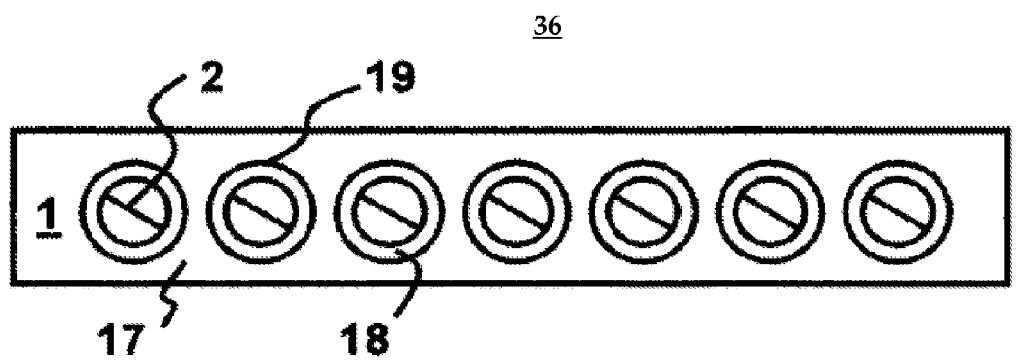
FIG. 5 is a cross-sectional top view showing an ensemble of mirrored balls covered with a lubricating liquid film in cells, surrounded by grid wires that form a grid block.
Figure 6:
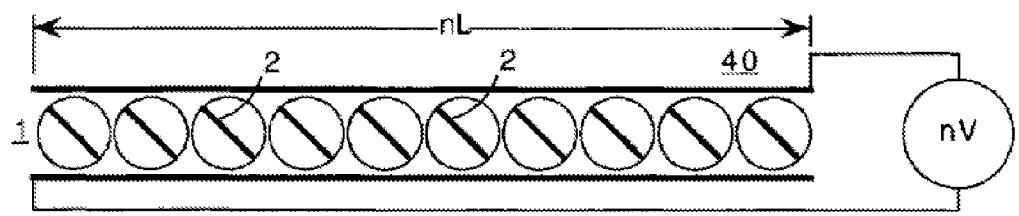
FIG. 6 is a cross-sectional view of an ensemble of n micromirrored elements between the electrodes of one grid block n times longer than in the previous FIGS. 1 and 2.

3—negative-end of an electret dipole
4—positive-end of an electret dipole
5—electret dipole
5t—top of a grid compartment
5b—bottom of a grid compartment
6—hemispheres of the balls
7—active or filled cell denoted by black
8—inactive or empty cell denoted by white
9—gap (dielectric i.e. insulating)
20—resistive grid wire
33—electronic control grid
34—electronic control grid 34 with active grid compartments in black and inactive grid compartments in white
35—tile of grid 34
36—grid block of 7 balls of FIG. 5 (similar to grid block of balls of FIG. 6)
40—grid block of 10 balls of FIG. 6 (similar to grid block of 9×9 balls of FIG. 4)
17—sheet containing balls (the grid is placed on the sheet)
18—lubricating liquid film
19—cavity that holds ball
E—electric field
d—total dipole moment
nL—the length of a block of n cells of length L containing n balls
nV—the voltage supply for n balls where V is the voltage needed to control 1 ball
V—voltage (number next to V indicates voltage location)
VS—voltage supply (may be used sequentially for cost reduction)
+—positive charge
−—negative charge

DETAILED DESCRIPTION OF THE PRESENTLY PREFERRED EMBODIMENTS

FIG. 1a is a cross-sectional view of a rotatable element 1 with an electret dipole 5 sandwiched between micro-mirrors 2 aligned parallel to the top surface of a grid compartment 5t and bottom surface of a grid compartment 5b, where an ensemble of such elements and electrodes are a major constituent of a micro-optics concentrator. The grid compartment is delineated by the grid electrodes (cf. FIGS. 2a and 2b). U.S. Pat. No. 7,133,183, "Micro-Optics Solar Energy Concentrator" by Mario Rabinowitz, describes the micro-optics concentrator in detail. The micro-mirrors 2 are shiny circular flat conducting metal close to the equatorial plane of the elements 1. A micro-processor sends signals via bus bars to establish voltages from a power supply to each corner of a grid compartment (cf. FIGS. 2a and 2b) whose edges are grid electrodes made of a highly resistive thin conductor. At the top of the grid compartment 5t, the left corner is at voltage V1 and the right corner is at voltage V2. For the bottom of grid compartment 5b, the left corner is at voltage V3 and the right corner is at voltage V4 as shown. If a signal sets the voltages so that V3=V1, V4=V2, V2<V1, and V4<V3, this produces an approximately uniform applied electric field E parallel to the grid compartment faces 5t and 5b as shown.

The applied electric field E induces a dipole moment in the metallic conducting material of the micro-mirrors 2. This is because when a metallic conductor is placed in an electric field, the charge distributes itself so as to produce a field free region inside the conductor. To internally cancel the applied field E, negative − free electrons move to the end of each conducting micro-mirror 2 opposite to the direction of E, leaving positive + charge at the end in the direction of E. The torque interaction of the induced electric dipole moment of the micro-mirrors 2 and the electric field E acts to align the micro-mirrors 2 parallel to the electric field E as shown here in FIG. 1. The torque is proportional to the product of E and the dipole moment.

An electret 5 may be used to augment the torque. In equilibrium i.e. when the rotation is complete, the polarization due to the electret 5 and that due to the induced charges of the conducting micro-mirrors 2 add together to produce a total dipole moment d parallel to the micro-mirrors 2, and parallel to the applied electric field E. The positive + end 4 and the negative − end 3 of the electret 5 align themselves parallel to the electric field E due to the torque interaction of the permanent electric dipole moment of the electret 5 and the applied electric field E, which is proportional to their product. Since the electret 5 and its dipole moment are parallel to the micro-mirrors 2, this torque interaction aligns the micro-mirrors 2 parallel to the applied electric field E.

The presence of the optional electret 5, enhances the torque. In the absence of the electret 5, the dipole moment induced in the micro-mirrors 2 can be sufficient to produce alignment. However, the additional torque provided by the electret 5 helps to overcome frictional effects. In this embodiment, the hemispheres 6 are made of the same transparent material which minimizes the effect of the zeta potential.

FIG. 1b is a cross-sectional view of a rotatable element 1 with an optional electret dipole 5 sandwiched between induced dipole micro-mirrors 2 aligned at a tilted angle with respect to the top of a grid compartment 5t and the bottom of a grid compartment 5b, where an ensemble of such elements and electrodes are a major constituent of a micro-optics concentrator. For the top of grid compartment 5t, the left corner is at voltage V1 and the right corner is at voltage V2. For the bottom of a grid compartment 5b, the left corner is at voltage V3 and the right corner is at voltage V4. A signal sets the voltages so that V1<V2, V3<V4, V1<V3, and V2<V4, producing an approximately uniform applied electric field E that is tilted with respect to the electrodes 5t and 5b as shown. The micro-mirrors 2 align themselves parallel to the electric field E due to the induced dipole field polarization of the mirrors, and permanent dipole of the electret 5. For balls, two-axis tracking is possible by additional alignment of the micro-mirrors 2 out of the plane of the paper. This is accomplished by similar voltage relationships to those already described as can be understood from the top and bottom electrode views shown in FIGS. 2a and 2b. Cylinders would be restricted to single-axis tracking. The chosen alignment angle i.e. tilt angle of the rotatable elements 1 can be held in place by the containment sheets (electrostatically cf. U.S. Pat. No. 7,133, 183 or by physical pressure U.S. Pat. No. 6,612,705) upon which the grid compartment 5t and 5b and grid electrodes is located. Thus during the interval between alignments, the alignment voltages may be switched off to conserve power.

FIG. 2a represents a top view of an array of grid compartments with grid spacing L showing in detail a top view of one such top grid compartment 5t and the voltages at its four corners V1, V2, V1' and V2'. Voltages V1 and V2 correspond to voltages V1 and V2 shown in the cross sectional FIGS. 1a, and 1b. Voltages V1' and V2' are the voltages at the corners of this top of grid compartment 5t below the plane of the paper. Each grid electrode is made of a highly resistive thin transparent conductor.

FIG. 2b represents a bottom view of an array of grid compartments delineated by highly resistive electrodes with grid spacing L showing in detail a view of a bottom electrode 5b and the voltages at its four corners V3, V4, V3' and V4'. Voltages V3 and V4 correspond to voltages V3 and V4 shown in the cross sectional FIGS. 1a and 1b. Voltages V3' and V4' are the voltages at the corners of this bottom electrode 5b below the plane of the paper.

Figure 3A:
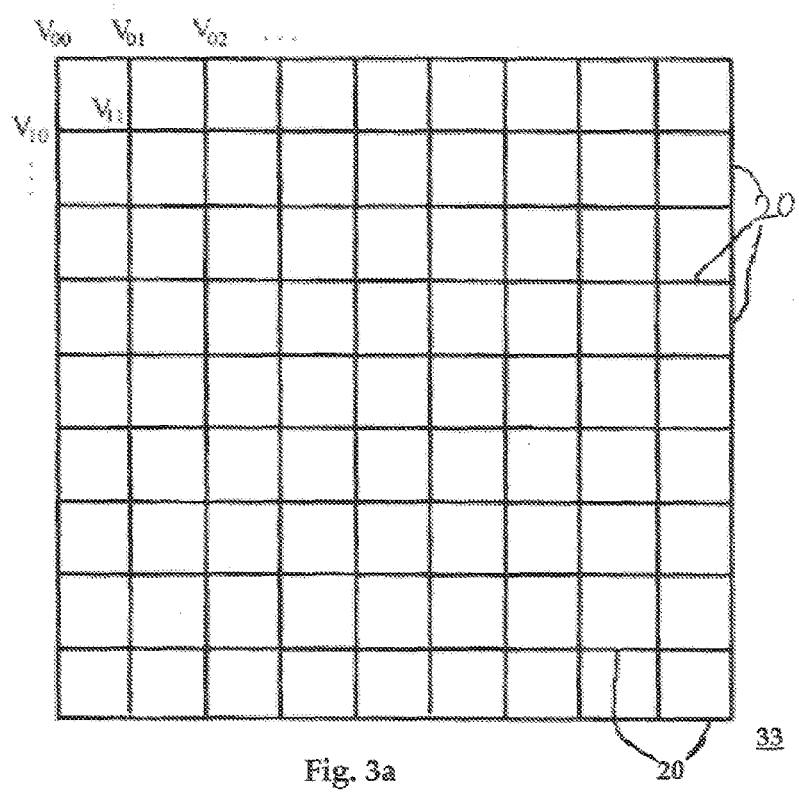
FIG. 3a is a schematic top view showing a generic electronic control grid that may represent a number of different kinds of transistorless grids; or grids with transistors at junctions, for matrix addressing and alignment of the optical elements of a solar concentrator or other similar optical equipment.

FIG. 3a is a schematic top view showing an electronic control grid 33 with resistive grid wires 20 for matrix addressing and alignment of the optical elements of a solar concentrator or other similar optical equipment. The term "equipment" is used in the instant invention to stand for Solar Energy Concentrators which may be of the Fresnel reflector type, or other types and equipment requiring addressing and alignment, such as optical switches and display equipment. This grid 33 can be laid on the bottom of the equipment, on the top and bottom of the equipment, on the top of the equipment with a ground plane on the bottom of the equipment, etc. In order to avoid having several similar looking figures, this schematic may be thought of as a representation of any one of several addressing grid arrays. It may be a wire grid array with one set of parallel wires on top of the equipment, separated and insulated from an orthogonal set of wires (that are parallel to each other) on the bottom of the equipment. It may be an actual interconnected grid with Thin Film Transistors (TFTs), tunneling junction transistors (as used in flash memories), or similar devices at each of the grid junctions. In this case it is preferable to use Polymer based transistors for flexibility. The grid 33 may be a segmented array with each square being a separate insulated slab (cf. to U.S. Pat. No. 6,964,486). In this case, the horizontal and vertical lines shown in FIG. 1 represent insulation between adjacent segments or slabs. The common element of all of these embodiments is the ability to impress the voltage Vij at the ij th node either statically or by means of a traveling wave. To minimize power dissipation, it is desirable to make the grid electrodes (edges) that delineate the grid compartments such as 5t and 5b of FIGS. 1 and 3 highly resistive so that a given voltage drop is accomplished with a minimum of current flow and hence with a minimum of power dissipation. The bus bars that bring the voltage to the grid electrodes may have a higher conductivity (lower resistance).

Figure 3B:
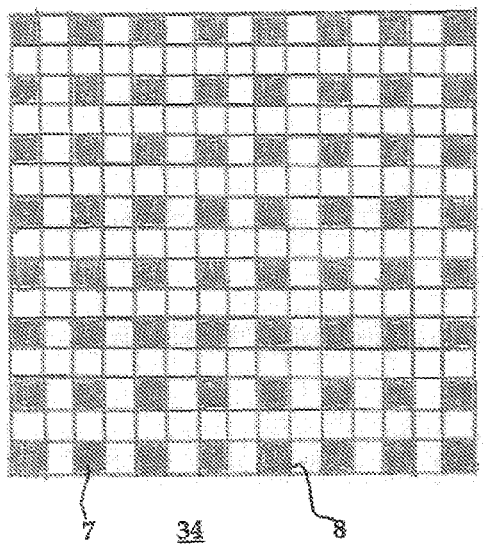
FIG. 3b is a schematic top view showing an electronic control grid 33 containing active grid compartments shown in black, and inactive grid compartments shown in white.

FIG. 3b is a schematic top view showing an electronic control grid 34 where for emphasis and clarity, active grid compartments are shown in black and inactive grid compartments shown in white. For some purposes such as cost-cutting, one may wish to use a transistorless grid. FIG. 3b illustrates the limitations that can be encountered, so that we may appreciate how the instant invention circumvents these limitations to increase the efficiency and capacity of the control grid; and furthermore the teaching of this invention can be used to reduce the cost of grids that use transistors at junctions.

The black squares of electronic control grid 34 indicate active grid compartments controlling cells filled with balls, i.e. active or filled cells 7. The white squares 8 of electronic control grid 34 indicate inactive grid compartments for cells with no balls, i.e. inactive or unfilled cells 8. The coverage efficiency or capacity for active cells (with balls that can be aligned) shown can only be 25% as will be derived in conjunction with the description of FIG. 3d.

Figures 3C, 3D:
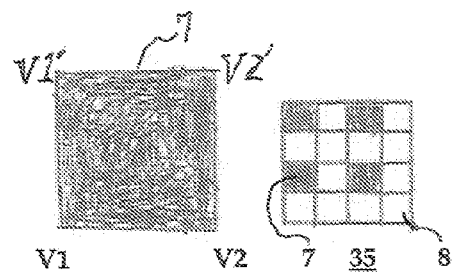
FIG. 3c shows an enlarged top view of an active grid compartment above an active cell (shown in black) because it contains a ball that can be aligned.
FIG. 3d shows an enlarged top view of a tile containing a block (set or batch) of active compartments of the grid containing cells (shown in black) of mirrored elements (balls, etc.) that can be aligned because they are in active cells.

FIG. 3c shows an enlarged top view of an active grid compartment above a cell containing a ball, i.e. an active filled cell 7 with voltages V1, V2, V1', and V2' at each corner. The corresponding bottom view of an active grid compartment below a cell containing a ball would have voltages V3, V4, V3', and V4' at each corner.

FIG. 3d shows an enlarged top view of a tile containing a block (set or batch) of 4 active compartments of the grid containing cells of mirrored elements (balls, etc.) that can be aligned because they are in active cells. The reason that only 4 individual balls can be properly aligned in this grid tile 35, is that each compartment must be capable of having an independent voltage applied at each corner. The grid tile 35 is the smallest unit (section) of the grid 33 (containing both filled cells with elements and unfilled cells with no elements) that can be repeated in either direction of the essentially two-dimensional grid, to fill the approximately two-dimensional space of the entire grid. A grid tile 34 controls all the balls in an ensemble within the tile. As shown here, in completing each tile insulating gaps 9 separate the blocks. In the first two calculations that follow, each insulating gap 9 is taken to be the same width as a grid compartment (or cell) i.e. approximately equal to a ball diameter (e.g. 0.1 mm to 4 mm).

The fraction of alignable balls in the tile 34 is:

$$F = \frac{\text{Block}}{\text{Tile}} = \frac{2 \times 2}{4 \times 4} = \frac{4}{16} = \frac{1}{4} = 25\%.$$

Since this tile repeats to completely fill the entire grid 33, 25% is the fraction of this whole transistorless grid 33 that can be properly aligned. This is because it takes N Tiles with N blocks in each one to totally fill the grid:

$$F = \frac{N \text{ Blocks/grid}}{N \text{ Tiles/grid}} = \frac{\text{Block}}{\text{Tile}} = \frac{2 \times 2}{4 \times 4} = \frac{4}{16} = \frac{1}{4} = 25\%.$$

FIG. 4 shows a grid with 12 square tiles (3×4) each containing a block of 81 active grid compartments (9×9) (shown in white for ease of counting) with 81% efficiency of coverage. The ensemble of balls in a block all achieve the same alignment. Balls in other blocks can have different alignments. The active compartments are not shaded black here (as they were in FIGS. 3a, 3b, 3c) so that one may clearly see the number of active cells.

The fraction of alignable balls in the grid 36 is:

$$F = \frac{N \text{ Blocks/grid}}{N \text{ Tiles/grid}} = \frac{\text{Blocks}}{\text{Tile}} = \frac{9 \times 9}{10 \times 10} = \frac{81}{100} = 81\%.$$

A coverage efficiency in excess of 90% is easily achievable. For example if the blocks contain a square array of 12×12 balls, and the insulating gaps separating tiles are ½ a cell in width:

$$F = \frac{N \text{ Blocks/grid}}{N \text{ Tiles/grid}} = \frac{\text{Blocks}}{\text{Tile}} = \frac{12 \times 12}{12.5 \times 12.5} = \frac{144}{156.3} = 92\%$$

If transistors are incorporated at grid junctions, there are now significantly fewer junctions requiring significantly fewer transistors. Furthermore, the optical transparency of the grid is increased as the grid occupies less area. This is a preferred embodiment to the use of ITO for grid transparency because ITO is very expensive.

It is to be emphasized that the white squares in FIG. 4 represent active grid compartments over active cells containing rotatable balls. The commonality of using the color white for the active grid compartments as in FIGS. 2a, 2b, and 3a should NOT be construed to mean that the lines in FIG. 4 which delineate the white squares are also grid lines. The grid lines are the edges of each 9×9 square. The lines inside each of the 9×9 squares are shown here for two reasons. One reason is to illustrate that these would be the grid lines in a conventional grid, but are absent in the instant invention. The other reason is to illustrate the number of active cells filled with balls so that the reader can be aided in seeing and counting the array of filled cells.

To reduce costs, the same Voltage Supply VS is used to sequentially electrify the various blocks. The Voltage Supply VS may be pre-connected to each block using switches, with sequencing controlled by a microprocessor.

FIG. 5 is a cross-sectional top view of a micro-optics ensemble of individually rotatable mirrored elements 1 (balls) showing the embedded micro-mirrors 2 in a sheet 17, as the main constituent of a micro-optics solar concentrator. The elements 1 are covered with a lubricating liquid film 18 inside enlarged cavities 19. The elements 1 are surrounded by a rectangle of grid wires that form a grid block 36. This rectangular grid block 36 of 7 balls is similar to the square grid block of FIG. 4 with 9×9=81 balls.

FIG. 6 is a cross-sectional view of an ensemble of n micro-mirrored elements 1 between the electrodes of one grid block 40 which is nL in length, i.e. n times longer than the grid length L in the previous FIGS. 1, 2, and 3. A grid length nL requires an approximately n times greater voltage, nV, to produce the same electric field in the longitudinal direction. In order to accomplish this economically, one can use a pulsed voltage source that is applied sequentially, since for applications like a solar concentrator, the elements 1 need only be aligned intermittently. The voltage source nV is applied (connected) sequentially to one block of the grid after the other. In the example shown n=10, so for a 10×10 block with a half width (½ ball diameter) gap, in a calculation similar to that presented in conjunction with the detailed description of FIG. 4, yields a coverage fraction $$F = \frac{N \text{ Blocks/grid}}{N \text{ Tiles/grid}} = \frac{\text{Blocks}}{\text{Tile}} = \frac{10 \times 10}{10.5 \times 10.5} = \frac{100}{110.3} = 91\%$$

The elements 1 (balls, cylinders, etc.) are preferably oriented as ensembles within grid blocks for collective alignment to simplify tracking and focusing, as well as to increase grid efficiency and capacity. Balls in other blocks can have different alignments. When ensembles are collectively oriented, they may have an ensemble projected concavity to aid in the focusing to the receiver. The number of mirrors per grid block is a design variable. The voltages can be controlled by a small micro-processor (computer) with analog voltage outputs.

ISSUES, ADVANTAGES, and ALTERNATIVE EMBODIMENTS

There is a trade-off between complexity of the grid, and size of the power supply and control system. One element per grid cell is the maximum complexity of the grid and control system, and presents the minimal requirement for the power supply. Unlike displays that require high resolution, ensembles of balls may be collectively oriented to simplify tracking and focusing without appreciably increasing the size of the voltage source (power supply). Alignment of large ensembles not only increases the efficiency and capacity of a transistorless grid, but also greatly reduces the number of transistors needed in a grid using transistors because the number of grid junctions is greatly reduced.

Furthermore, reduction in the number of grid junctions reduces the complexity and size of the grid making sequential use of the same voltage source more feasible. Only intermittent alignment of the elements is necessary in the tracking of the sun, so a pulsed or step function voltage source may be used sequentially. An intermittent use of a voltage source is cheaper and much less difficult to achieve than the same steady state voltage powering the grid simultaneously.

Some may think that a simpler grid with larger grid spacing having fewer grid wires could just as well be achieved with larger mirrored elements (balls) that reflect the same amount of light. However, there are two reasons why this alternative embodiment is much less desirable than the preferred embodiments described above. The first reason is that much more material is required in such an alternative embodiment, greatly increasing the costs. The second reason is more subtle and so will be illustrated with an approximate calculation. Assuming constant density ρ, of a small sphere of mass m and radius r, it's moment of inertia is $$I_{1s} = \frac{2}{5}mr^2 = \frac{2}{5}\left[\left(\frac{4}{3}\pi r^3\right)\rho\right]r^2 = \frac{8}{15}\pi\rho r^5.$$

For a given applied torque τ, the angular acceleration of a single small sphere would be $$\alpha_{1s} = \frac{\tau}{I_{1s}} = \frac{15}{8\pi\rho r^5} \propto \frac{1}{r^5}.$$

For one big sphere of mass M and radius R=nr, the moment of inertia is $$I_{1b} = \frac{2}{5}MR^2 = \frac{2}{5}\left[\frac{4}{3}\pi(nr)^3\rho\right](nr)^2 = \frac{8}{15}\pi\rho n^5 r^5.$$

Therefore the angular acceleration and hence the response time of the big sphere is greatly reduced for the same torque, being $1/n^5$ of that of the small sphere:

$$\frac{\alpha_{1b}}{\alpha_{1s}} = \frac{I_{1s}}{I_{1b}} = \frac{1}{n^5}.$$

For the same torque acting on an ensemble of n small spheres so that each one experiences a torque of only τ/n, the acceleration of the ensemble is reduced to $$\alpha_{ns} = \frac{\tau/n}{I_{1s}} = \frac{15}{8\pi\rho n r^5} \propto \frac{1}{nr^5}.$$

Although the response time of the ensemble is reduced by a factor of n, it is still $n^4$ times faster than for a big sphere of radius R=nr.

Therefore, as taught in this instant invention there are manifold economic and technological advantages to increasing the efficiency and capacity of the control grid. As taught in another embodiment of this invention the number of transistors required is significantly reduced because the number of grid junctions is significantly reduced by the technique of aligning blocks of balls rather individual balls. A fringe benefit is that the greatly increased spacing between grid wires substantially increases the grid transparency, thereby increasing the visibility of the underlying optical equipment such as a solar concentrator. This removes the need for an expensive ITO grid.

Another embodiment of the instant invention involves active tracking by means of feedback control. Even if the micro-mirrors do not tend to align precisely in the desired direction from the predetermined applied electric field for any reason, fine tuning of the alignment can be done with feedback control directly from the solar photovoltaic receiver, and/or a much more sensitive photomultiplier attached to the receiver. Solar concentrators may be classified either as passive non-tracking, predictive-tracking, or active-tracking. A predictive device uses a microprocessor to store and/or compute azimuth and attitude (elevation) coordinates for the sun's position. An active device utilizes sensors which in real time detect changes in the incident solar radiation either due to changes in the sun's position or atmospheric occlusion such as clouds. The sensors communicate via a microprocessor to activate the grid to point the active optical elements (e.g. mirrored balls) of the solar concentrator to that region of the sky that provides the most radiation. The microprocessor selectively addresses individual grid wires for establishing independent voltage differences to align (control) the active optical elements. For a detailed description of some methods for operating and coupling to control grids, refer to U.S. Pat. No. 6,964,486 by Mario Rabinowitz, "Alignment of Solar Concentrator Micro-Mirrors" issued on Nov. 15, 2005; and U.S. Pat. No. 7,187,490 by Mario Rabinowitz, "Induced Dipole Alignment Of Solar Concentrator Balls" by Mario Rabinowitz.

SCOPE OF THE INVENTION

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents. It is to be understood that in said claims, ingredients recited in the singular are intended to include compatible combinations of such ingredients wherever the sense permits. It should be recognized that the methods and apparatus of this invention can be used in other contexts than those explicitly described herein. It is also to be understood that the following claims are intended to cover all of the generic and specific features of the invention herein described, and all statements of the scope of the invention which, as a matter of language, might be said to fall there between.

The invention claimed is:

1. Solar energy alignment equipment comprising:
   a) two opposing outer surfaces;
   b) alignable inner elements;
   c) at least one of said outer surfaces composed of a two-dimensional grid of vacant blocks, and filled blocks with conducting faces;
   d) at least one layer of thin electronic control wires on said outer surface in electrical contact with said conducting blocks;
   e) at least one alignable element inside each of said blocks with conducting faces;
   f) said blocks forming a grid tile;
   g) said tile being the smallest section of grid containing both blocks filled with elements and vacant blocks with no elements;
   h) at least one voltage supply to apply voltage on said control wires;
   i) said voltage producing an electric field for coupling to said elements; and
   j) each filled block controlling the alignment of at least one element inside it.

2. The equipment of claim 1 wherein said voltage supply is applied sequentially to said control grid.

3. The equipment of claim 1 wherein said blocks control ensembles of elements.

4. The equipment of claim 1 wherein said control grid contains transistors at the grid junctions.

5. The equipment of claim 1 wherein said control grid is addressed by a microprocessor.

6. The equipment of claim 1 wherein independent voltages are established at the eight vertices of the parallelepiped formed by the conducting faces of two adjacent blocks.

7. The equipment of claim 1 wherein independent voltages are established at the four vertices of one conducting face of a block, with an additional voltage established at a second conducting face on the opposite side of said block.

8. The equipment of claim 1 wherein said elements are actively aligned by means of feedback control.

9. The equipment of claim 1 wherein said elements are aligned in any angular direction.

10. The equipment of claim 1 wherein said elements are actively aligned by the signal from a photomultiplier.

11. A method for addressing optical equipment comprising the steps of:
    a) forming two outer surfaces;
    b) composing a two-dimensional grid of vacant blocks, and filled conducting blocks between said surfaces;
    b) placing alignable inner elements inside said filled conducting blocks;
    d) placing in electrical contact a layer of thin electronic control wires with at least one layer of said conducting blocks;
    e) placing at least one alignable element inside each of said conducting blocks;
    f) applying a voltage on said control wires by means of a microprocessor;
    g) said voltage producing an electric field for coupling to said elements; and
    h) controlling the alignment of the ensemble of elements beneath each block by the applied electric field.

12. The method of claim 11 wherein said voltage supply is applied sequentially to said control grid.

13. The method of claim 11 wherein said control grid contains transistors at the grid junctions.

14. The method of claim 11 wherein said blocks function in controlling ensembles of said rotatable inner elements.

15. The method of claim 11 wherein said microprocessor selects at least one element and produces an electric field that directs said element over an angular range of directions.

16. Optical equipment comprising:
    a) two outer surfaces;
    b) alignable inner elements;
    c) at least one of said outer surfaces composed of a two-dimensional grid of vacant blocks, and filled blocks with conducting faces;

d) at least one layer of thin electronic control wires on said outer surface in electrical contact with said blocks with conducting faces;
e) an alignable element inside each of said blocks with conducting faces;
e) said blocks forming a grid tile;
f) said tile being the smallest section of grid containing both blocks filled with elements and vacant blocks with no elements;
k) at least one voltage supply to apply voltage on said control wires;
l) said voltage producing an electric field for coupling to said elements; and
m) each block controlling the alignment of the ensemble of elements inside it.

17. The equipment of claim 16 wherein said control grid contains transistors at the grid junctions.

18. The equipment of claim 16 wherein said blocks control ensembles of elements.

19. The equipment of claim 16 wherein the same voltage supply is applied sequentially to the individual grid blocks.

20. The equipment of claim 16 wherein said filled blocks and vacant blocks form a mosaic between said surfaces.

* * * * *